United States Patent
Atkinson et al.

(10) Patent No.: US 10,979,649 B2
(45) Date of Patent: Apr. 13, 2021

(54) AUXILIARY APPARATUS FOR A DIGITAL IMAGING DEVICE

(71) Applicants: Don Atkinson, Delano, MN (US);
Samuel Joseph Schmidt, Brooklyn Center, MN (US)

(72) Inventors: Don Atkinson, Delano, MN (US);
Samuel Joseph Schmidt, Brooklyn Center, MN (US)

(*) Notice: Subject to any disclaimer, the term of this patent is extended or adjusted under 35 U.S.C. 154(b) by 0 days.

(21) Appl. No.: 16/261,159

(22) Filed: Jan. 29, 2019

(65) Prior Publication Data
US 2019/0238741 A1  Aug. 1, 2019

Related U.S. Application Data

(60) Provisional application No. 62/677,971, filed on May 30, 2018, provisional application No. 62/644,743, (Continued)

(51) Int. Cl.
| | |
|---|---|
| H04N 5/235 | (2006.01) |
| G01C 3/08 | (2006.01) |
| G01H 1/00 | (2006.01) |
| G03B 15/05 | (2021.01) |
| G06F 3/01 | (2006.01) |

(Continued)

(52) U.S. Cl.
CPC ............ H04N 5/2354 (2013.01); G01C 3/08 (2013.01); G01H 1/00 (2013.01); G03B 7/16 (2013.01); G03B 15/05 (2013.01); G03B 17/18 (2013.01); G06F 3/016 (2013.01); H04M 1/7253 (2013.01); H04N 5/2351 (2013.01); G03B 17/566 (2013.01); G03B 2206/00 (2013.01);

(Continued)

(58) Field of Classification Search
CPC ........ G03B 17/566; G03B 7/16; G03B 15/05; G03B 2215/0514; G03B 2215/056; G03B 2215/05; G03B 17/18; H04M 1/7253; H04N 5/2354; H04N 5/2351; G01C 3/08; G01H 1/00; G06F 3/016
See application file for complete search history.

(56) References Cited

U.S. PATENT DOCUMENTS 3,745,323 A * 7/1973 Morse ...................... G03B 7/16
  362/5
4,317,624 A * 3/1982 Shenk ...................... G03B 7/16
  396/105

(Continued)

FOREIGN PATENT DOCUMENTS

| EP | 1041428 A1 * 10/2000 ............... G03B 7/16 |
|---|---|
| JP | 2003163834 A * 6/2003 |

(Continued)

OTHER PUBLICATIONS

CN-204359269-u to Wu Mengliang, May 2015 (Year: 2015).*

*Primary Examiner* — David E Harvey
(74) *Attorney, Agent, or Firm* — Grogan, Tuccillo & Vanderleeden, LLP

(57) ABSTRACT

An apparatus for a digital imaging device includes a housing, a controller within the housing, and at least one illumination element in communication with the controller. The controller is configured to control at least one of an intensity and/or volume of light emitted by the at least one illumination element in dependence upon a distance of the apparatus from a target surface.

17 Claims, 8 Drawing Sheets

Related U.S. Application Data filed on Mar. 19, 2018, provisional application No. 62/623,252, filed on Jan. 29, 2018.

(51) Int. Cl.
*H04M 1/725* (2021.01)
*G03B 17/18* (2021.01)
*G03B 7/16* (2021.01)
*G03B 17/56* (2021.01)

(52) U.S. Cl.
CPC ............ *G03B 2215/0503* (2013.01); *G03B 2215/0567* (2013.01)

(56) References Cited

U.S. PATENT DOCUMENTS

| | | | | |
|---|---|---|---|---|
| 4,368,966 A * | 1/1983 | Hagyuda | ............... | G03B 15/03 250/214 SF |
| 5,093,681 A * | 3/1992 | Matsuzaki | ............... | G03B 7/16 396/163 |
| 5,126,778 A * | 6/1992 | Wheeler | ............... | G03B 7/16 396/106 |
| 5,194,885 A * | 3/1993 | Spencer | ............... | G03B 15/05 396/182 |
| 5,287,134 A * | 2/1994 | Cocca | ............... | G03B 7/16 396/203 |
| 5,315,342 A * | 5/1994 | Cocca | ............... | G03B 7/16 396/104 |
| 6,353,711 B1 * | 3/2002 | Numako | ............... | G03B 7/16 396/180 |
| 7,016,603 B2 * | 3/2006 | Clark | ............... | G03B 9/70 396/429 |
| 7,717,630 B1 | 5/2010 | Wan | | |
| 7,751,653 B2 | 7/2010 | Bodnar et al. | | |
| 8,326,140 B2 * | 12/2012 | Clark | ............... | G03B 15/05 396/182 |
| 8,891,954 B1 * | 11/2014 | Baker | ............... | G03B 15/03 396/162 |
| 9,325,884 B2 | 4/2016 | Fletcher et al. | | |
| 9,395,292 B2 | 7/2016 | Wei et al. | | |
| 2002/0015590 A1 * | 2/2002 | Chen | ............... | G03B 15/05 396/182 |
| 2002/0145769 A1 * | 10/2002 | Pollard | ............... | H04N 1/40056 358/504 |
| 2002/0154907 A1 * | 10/2002 | Ojima | ............... | G03B 15/02 396/61 |
| 2003/0197611 A1 * | 10/2003 | Clifford | ............... | G07G 1/0045 340/572.1 |
| 2004/0141320 A1 | 7/2004 | Bock et al. | | |
| 2005/0041142 A1 | 2/2005 | Lai | | |
| 2005/0046739 A1 * | 3/2005 | Voss | ............... | H04N 5/2354 348/371 |
| 2005/0105791 A1 | 5/2005 | Lee et al. | | |
| 2005/0140794 A1 | 6/2005 | Yahagi | | |
| 2006/0078199 A1 | 4/2006 | Bodnar et al. | | |
| 2006/0078225 A1 | 4/2006 | Pearson et al. | | |
| 2007/0205277 A1 * | 9/2007 | Tashiro | ............... | A47F 9/047 235/383 |
| 2007/0280660 A1 * | 12/2007 | Yeh | ............... | G03B 7/16 396/61 |
| 2008/0239093 A1 * | 10/2008 | Easwar | ............... | G06T 9/007 348/222.1 |
| 2011/0317988 A1 * | 12/2011 | Lee | ............... | G03B 7/16 396/61 |
| 2012/0033195 A1 | 2/2012 | Tai | | |
| 2012/0229663 A1 | 9/2012 | Nelson et al. | | |
| 2012/0243783 A1 | 9/2012 | Zimmer | | |
| 2013/0147711 A1 | 6/2013 | Njolstad et al. | | |
| 2013/0206839 A1 | 8/2013 | Gao | | |
| 2013/0300919 A1 | 11/2013 | Fletcher et al. | | |
| 2014/0009603 A1 | 1/2014 | Atkin et al. | | |
| 2014/0061305 A1 * | 3/2014 | Nahill | ............... | G06K 7/0095 235/438 |
| 2014/0313377 A1 | 10/2014 | Hampton | | |
| 2014/0340572 A1 * | 11/2014 | Sato | ............... | G03B 7/08 348/370 |
| 2014/0368345 A1 | 12/2014 | Dobbins et al. | | |
| 2014/0369575 A1 | 12/2014 | Riopka et al. | | |
| 2015/0065803 A1 | 3/2015 | Douglas et al. | | |
| 2015/0127340 A1 * | 5/2015 | Epshteyn | ............... | G10L 15/26 704/235 |
| 2015/0264202 A1 * | 9/2015 | Pawlowski | ............... | H04N 5/232 348/207.11 |
| 2015/0304555 A1 | 10/2015 | Ehrenkranz | | |
| 2016/0040869 A1 * | 2/2016 | Lukashevich | ............... | G03B 15/05 362/3 |
| 2016/0209727 A1 * | 7/2016 | Smith | ............... | G03B 15/05 |
| 2016/0232828 A1 | 8/2016 | Jia et al. | | |
| 2016/0277660 A1 * | 9/2016 | Kaiser | ............... | F16M 13/02 |
| 2016/0292662 A1 * | 10/2016 | Kobayashi | ............... | G07G 1/0036 |
| 2016/0342070 A1 * | 11/2016 | Chang | ............... | H01L 51/504 |
| 2017/0068855 A1 * | 3/2017 | Sharma | ............... | G06K 9/00637 |
| 2017/0353649 A1 * | 12/2017 | Yang | ............... | G01S 17/023 |
| 2018/0017846 A1 * | 1/2018 | Takai | ............... | G03B 15/05 |

FOREIGN PATENT DOCUMENTS

| | | | | |
|---|---|---|---|---|
| WO | WO-2015047150 A1 * | 4/2015 | ............ | G03B 15/05 |
| WO | 2016049259 | 3/2016 | | |

* cited by examiner

AUXILIARY APPARATUS FOR A DIGITAL IMAGING DEVICE

CROSS-REFERENCE TO RELATED APPLICATIONS

This application claims the benefit of U.S. Provisional Application Ser. No. 62/623,252, filed on Jan. 29, 2018, U.S. Provisional Application Ser. No. 62/644,743, filed on Mar. 19, 2018, and U.S. Provisional Application Ser. No. 62/677,971, filed on May 30, 2018, each of which are hereby incorporated by reference herein in their entireties.

FIELD OF THE INVENTION

The present invention relates generally to digital image capture and, more particularly, to an auxiliary apparatus for a digital imaging device that enhances or enables more precise and/or accurate acquisition of surface property data of a target surface by a digital imaging device.

BACKGROUND OF THE INVENTION

Cameras, specifically digital cameras, are currently the most commonly utilized image capture device, and can be found in many commonly owned and carried products, such as smartphones and/or tablet devices. While such cameras and other digital image capturing devices (also referred to herein as digital imaging devices) are generally suited for what may be regarded as ordinary performance, the ability of such devices to precisely capture surface property characteristics and data of a target surface is limited.

In particular, digital cameras commonly found in tablets, smartphones and other devices are designed and intended to take pictures of a quality that is acceptable and pleasing to lay users of such devices, for ordinary viewing, sharing on social media and other platforms, and similar uses. Such devices, however, do not allow for the acquisition or derivation of surface property characteristic data, namely, data capable of defining dimensional, topographical and tonal properties of a surface, from captured images of the surface, at least not to an extent that is reliable, precise and/or accurate.

While certain devices do exist that capture this type of data and/or information, such devices are highly specialized and not intended for ordinary consumer use, and therefore have not been integrated into consumer devices such as smartphones and tablets. Indeed, as indicated above, capturing or deriving this type of surface property characteristic data is not possible with the smartphones, tablets and other consumer handheld devices that are available today.

In view of the above, there is a need for an auxiliary apparatus for a digital imaging device such as a smartphone or tablet that enhances or enables more precise and/or accurate acquisition of surface property data of a target surface by such digital imaging device. Such surface property data may include, for example, hue, saturation and brightness, and/or dimensional and/or topographical characteristics of a target surface. In particular, there is a need for an apparatus and method that enables the average smartphone or tablet, with its common digital camera, to capture images in a manner that enables the phone or tablet to process and produce highly precise, accurate and repeatable surface property characteristic data, including tonal characteristics.

SUMMARY OF THE INVENTION

It is an object of the invention to provide an auxiliary apparatus for a digital imaging device.

It is another object of the invention to provide an auxiliary apparatus for a digital imaging device that enables the digital imaging device to gather accurate and consistent dimensional, topographical and tonal properties and characteristics of a target surface so that the digital imaging device can thereafter process and measure such properties and characteristics.

It is another object of the invention to provide an auxiliary apparatus for a digital imaging device that enables the digital imaging device to capture, measure and process surface property data including hue, saturation and brightness.

It is another object of the invention to provide an auxiliary apparatus for a digital imaging device that is capable of controlling the ambient environment around a target surface without contacting the target surface.

It is another object of the invention to provide an auxiliary apparatus for a digital imaging device that is capable of illuminating a target surface in a stable and consistent manner.

It is another object of the invention to provide an auxiliary apparatus for a digital imaging device that is capable of illuminating a target surface to effectively negate any effects of ambient light on the target surface.

It is another object of the invention to provide an auxiliary apparatus for a digital imaging device that is capable of communicating with the digital imaging device.

It is another object of the invention to provide an auxiliary apparatus for a digital imaging device that is capable of communicating information to the digital imaging to assist the digital imaging device in dimensional topographical and tonal calculations.

These and other objects are achieved by the present invention.

In an embodiment, an apparatus for a digital imaging device is provided. The apparatus includes a housing, a controller within the housing, and at least one illumination element in communication with the controller. The controller is configured to control at least one of an intensity and/or volume of light emitted by the at least one illumination element in dependence upon a distance of the apparatus from a target surface.

In another embodiment, a method of enabling a digital imaging device to acquire surface property data from a target surface is provided. The method includes the steps of, with an auxiliary apparatus coupled to the digital imaging device, sensing a distance of the auxiliary apparatus from the target surface, with the auxiliary apparatus, generating at least one of a haptic signal and/or audible tone when the distance equals a predetermined distance, at least one of the haptic signal and the audible tone being configured for detection by the digital imaging device, and in response to a haptic signal, flash or sound from the digital imaging device, illuminating the target surface with light emitted from at least one illumination element of the auxiliary apparatus.

In yet another embodiment, an apparatus for enabling a digital imaging device to acquire, measure and/or process surface property data of a target surface is provided. The apparatus includes a controller, at least one illumination element in communication with the controller, the at least one illumination element being configured to emit light of a sufficient intensity and/or volume to substantially negate effects of ambient light on an appearance of the target surface to a camera of the digital imaging device, a distance sensor in communication with the controller, the distance sensor being configured to sense a distance of the auxiliary apparatus from a target surface, and a light sensor in communication with the controller, the light sensor being configured to detect light from a flash of the digital imaging device.

BRIEF DESCRIPTION OF THE DRAWING

The present invention will be better understood from reading the following description of non-limiting embodiments, with reference to the attached drawings, wherein below.

DETAILED DESCRIPTION OF THE EMBODIMENTS

Figure 2:
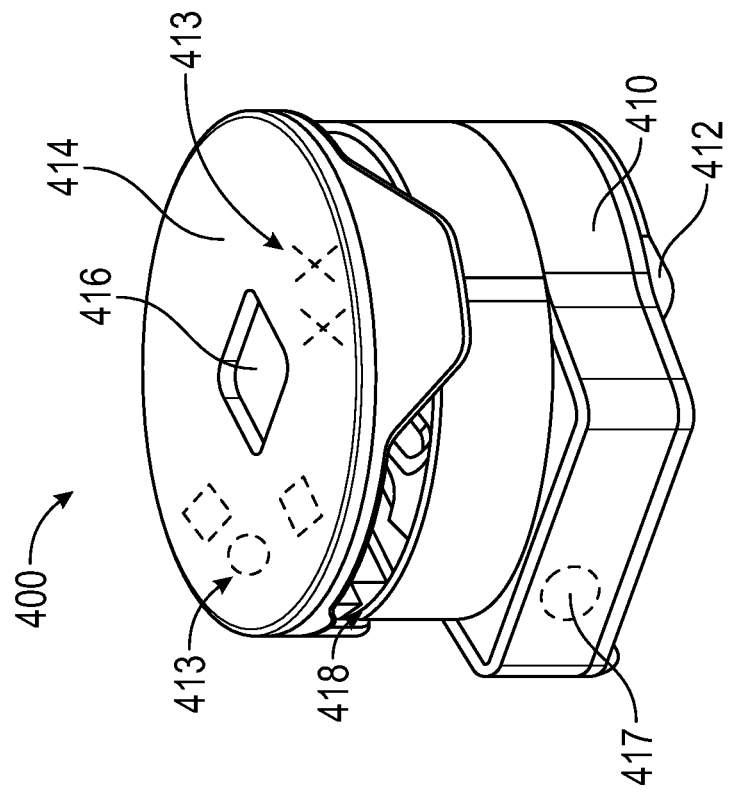
FIG. 2 is another perspective view of the auxiliary apparatus of FIG. 1.
Figure 1:
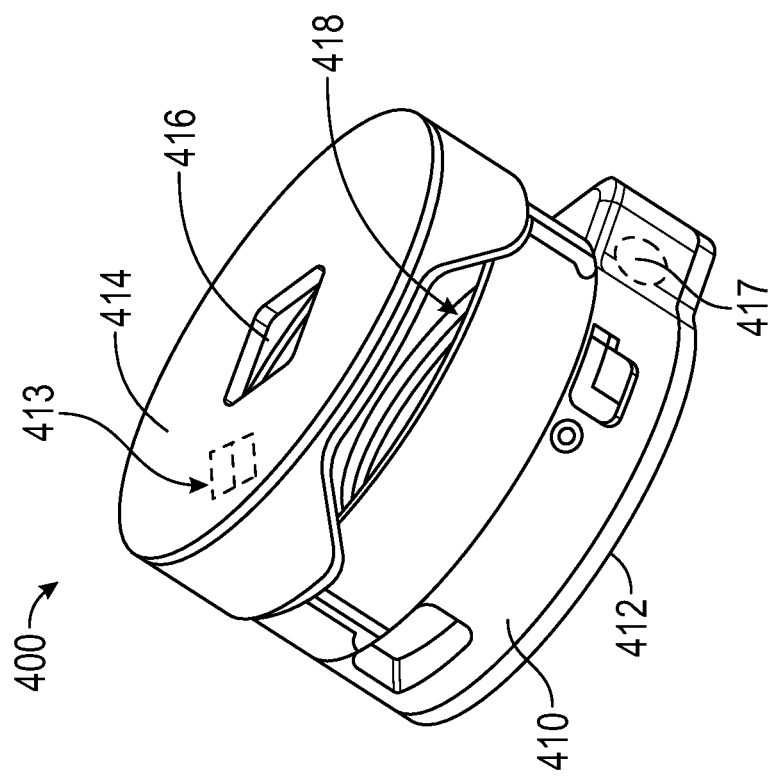
FIG. 1 is a perspective view of an auxiliary apparatus for a digital imaging device, according to an embodiment of the present invention.

Referring to FIGS. 1 and 2, an auxiliary apparatus 400 for a digital imaging device according to an embodiment of the present invention is illustrated. The digital imaging device may be a single image or video capturing device functioning as standalone digital camera, or an RGB sensor or digital video or single image camera integrated into and contained within a computing tablet, smartphone, a wearable garment or personal accessory like a watch, bracelet, necklace or glasses. The RGB sensor or digital camera could also be integrated into a UAV (Unmanned Aerial Vehicle).

As shown in FIGS. 1 and 2, the auxiliary apparatus 400 may be generally cylindrical in shape and includes a fixture 410 defining a housing combining electronic and digital circuitry and a light source including one or more light emitters 417. The light emitters 417 may be light emitting diodes (LEDs), although the light emitters 417 may take other forms known in the art without departing from the broader aspects of the invention. The fixture 410 may also integrate optics to prevent chromatic aberrations, filters to control surface glare and various forms of batteries or charging systems. As used herein, the fixture 410 may also be referred to as "lighting fixture 410". The auxiliary apparatus 400 is configured to be removably attached to the digital imaging device (e.g., a smartphone, tablet or the like) via a mating surface 412 on the lighting fixture 410. An aperture in the mating surface 412 allows a line of sight from the lens of the digital imaging device into the auxiliary apparatus 400, to allow for viewing of a target surface via a display screen of the digital imaging device.

In an embodiment the fixture/housing 410 may take the form of an open cone, having an open end for interfacing with a target surface to be imaged. In some embodiments, as shown in FIGS. 1 and 2, the auxiliary apparatus 400 may also include a disk 414 permanently or removably attached to the lighting fixture 410 opposite the mating surface 412, and which includes a central viewing window 416, the purpose of which will be described hereinafter. The disk 414 (and the inner surface thereof) is fixedly positioned at a predetermined distance away from the lighting fixture 410 and lighting arrangement thereof. Importantly, therefore, the disk 414 is in fixed position, at a predetermined and constant distance from the lens and imaging sensor of the digital imaging device to which the auxiliary apparatus 400 is attached, to enable the digital imaging device to adequately focus on the surface being captured. In either the case, the housing has an open end that allows for ambient light to enter and illuminate the target surface when the apparatus 400 is placed in contact with the target surface, and the height of the housing ensures that the camera of the digital imaging device is placed at an accurate and repeatable distance from the target surface during image capture.

As will be evident, the appropriate, adequate focusing distance (i.e., the focal length distance) can be altered in dependence upon the operational characteristics of the digital imaging device to which the surface property capture device is attached. In an embodiment, the height of the housing (which defines a fixed distance from the open end of the housing to the lens of the digital imaging device) may be selected to be substantially equivalent to the focal length a lens of the digital imaging device.

The combined integration of the lighting fixture 410 enables a user of a digital imaging device to simply attach the auxiliary apparatus 400 to the digital imaging device, position apparatus 400 against the target surface to be captured, and capture the image and data using the standard imaging capabilities of the digital imaging device.

Figure 5:
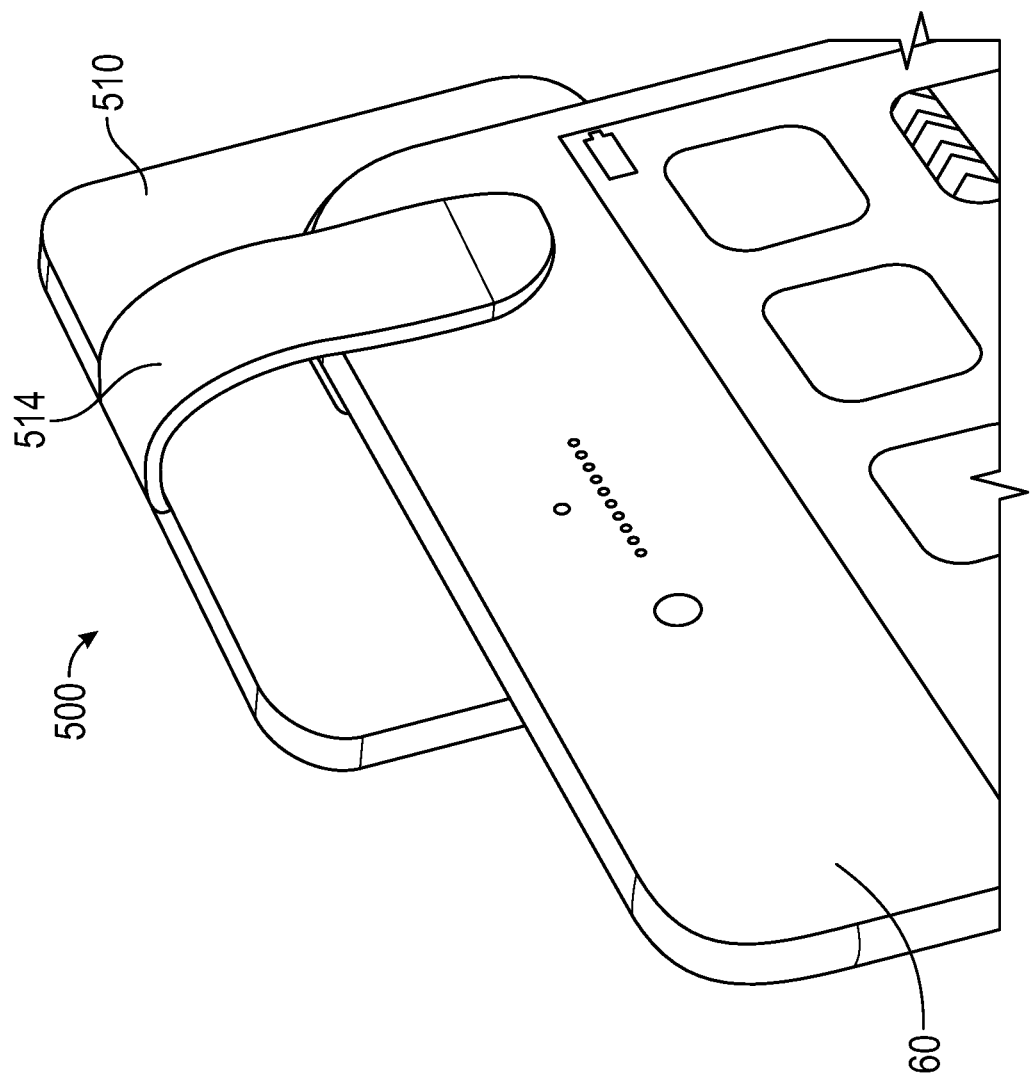
FIG. 5 is a rear, perspective view of the auxiliary apparatus of FIG. 3.

As best shown in FIG. 5, the auxiliary apparatus 400 also includes a space or opening 418 that allows ambient light to enter the surface property capture device 400 and illuminate the target surface. In an embodiment, the opening 418 may be a plurality of openings spaced about the outer periphery of the auxiliary apparatus 400. Importantly, by permitting ambient light to enter the interior of the auxiliary apparatus 400, a user can visually position the auxiliary apparatus 400 in registration with a target area of a surface without needing to illuminate the surface with the light fixture 410 or other non-ambient light source.

In operation, therefore, a user may attach the auxiliary apparatus 400 to a digital imaging device via the mating surfaces on the auxiliary apparatus 400 and digital imaging device. Looking through the display screen on the digital imaging device, a user can then position or center apparatus 400 over a target area on a surface. This step is possible due to the ambient light that is allowed to enter the auxiliary apparatus 400 and illuminate the surface. Importantly, at the moment of image capture, the lighting fixture 410 generates a volume of light necessary to significantly minimize the detrimental effects of the uncontrolled environmental ambient light illuminating the surface being captured. In particular, the light emitters of the integrated lighting fixture 410 generate light having properties sufficient to substantially dilute or eliminate the effects of the ambient light on the target surface. This method effectively provides a controlled and consistently lighted environment in which to capture the surface properties and characteristics of any surface being imaged by the digital imaging device.

In addition, to further reduce and counter the effects of the uncontrolled environmental ambient light illuminating the surface to be captured, an image capture may be taken of the surface while illuminated by only ambient light. This captured image can be used by the digital imaging device to evaluate the volume, color temperature and uniformity of the uncontrolled ambient light. This light evaluation data can then be used in a post-image-capture process to measure the effects it may have on the light being emitted from the lighting fixture 410, and subsequently accounted for and calculated into (or out of) the final lighting data to further refine and minimize the effects of the ambient light.

Importantly, by having openings 418 that allow ambient light from outside the device to illuminate the target surface through the distal opening/open end, the device 400 may be precisely aligned with the target area of the surface to be analyzed under direct visualization by a user (by looking through the screen of the digital imaging device), without requiring any integrated or 'artificial' light source to be utilized. This is in contrast to the existing devices which require a substantially light-tight environment within ashroud for image capture, which prevents accurate initial alignment of the device on a surface without using integrated LEDs or the like. Moreover, by using an illumination source within the light fixture 410 that can sufficiently negate the effects of any ambient light on the target surface, there is no need to provide a light-tight shroud which, as discussed above, allows for better alignment under direct visualization and thus renders the device, overall, easier to use. In an embodiment, rather than being integrated into a shroud/housing as discussed above, the illumination source capable of pushing an adequate volume of light to negate the effects of the ambient light may alternatively be integrated into the digital imaging device itself. In particular, in certain embodiments, the auxiliary apparatus may be entirely omitted from the system so long as the digital imaging device has an illumination source sufficient to substantially negate the effects of the ambient light on the target surface.

Once an image of the target surface is captured under illumination from the illumination source, the digital imaging device may process the image to produce desired surface property characteristic data including, for example, hue, saturation and brightness.

In an embodiment, the lighting fixture 410 can additionally be configured to contain, direct and angle the light being emitted onto the surface being captured, as well as to illuminate the areas surrounding the auxiliary apparatus 400 (e.g., outside the surface property capture device 400). Accordingly, the lighting fixture 410 can therefore be operable to project controlled light at the surface to be captured as well as around the outside of the surface property capture device 400 which would, in effect, create a more controlled 'ambient light environment' surrounding the surface property capture device 400 and surface to be captured.

In an embodiment, the light emitters contained in the lighting fixture 410 can be controlled and affixed in many ways to capture specific and different dimensional, topographical and tonal property and characteristic data. For example, in certain embodiments, one or more light emitters may emit light at a 0/45° geometry to match measurement conditions used in industrial applications, one or more light emitters may emit light at a pre-determined geometry to illuminate a sample area and reference targets with separate illumination volume, angle, geometry, surface uniformity and color temperature, and/or one or more light emitters may emit light of a scene-aware intensity to match the variable measurement conditions required for that individual situation.

In an embodiment, one or more light emitters of the lighting fixture 410 may emit light with various color temperatures and colors separately, together or in a controlled sequence that is used by software and mathematical methods described herein to detect the possibility of metamers. It is contemplated that the various light colors may be achieved by using various colored light emitters or placing various color filters in front of the light emitters.

While the embodiments described herein disclose image capture occurring when the digital imaging device and auxiliary apparatus are stationary, in certain embodiments, data capture may take place as the digital imaging device and attached auxiliary apparatus are moved across a surface. In this embodiment, the digital imaging device captures frames as it is moved across a surface, and the frames are then stitched into one larger image, thereby reducing the need for the open end of the housing to be made larger to capture a larger surface area.

As alluded to above, it is contemplated that in some embodiments, the camera or smartphone may be have lights and be capable of pushing an adequate volume of light to cancel the negative effects of the ambient light environment without the need for any housing or enclosure. Eliminating the open-ended cone/housing would allow the device to capture the surface characteristics across a larger area than is possible through the fixed-diameter of the open end of the housing.

The auxiliary apparatus 400 therefore enables any such digital imaging device to gather accurate and consistent dimensional, topographical and tonal properties and characteristics by precisely controlling the primary factors needed to capture consistent data. Some of these primary factors include the volume, angle, geometry, surface uniformity and the color temperature of the light(s) used to illuminate the surface or item being captured, and the ambient light environment surrounding and illuminating a target surface being captured/measured.

In addition to the points above, in an embodiment, the auxiliary apparatus 400 also integrates a means by which the data captured, i.e., the surface property and characteristic data obtained by the digital imaging device, can be referenced to, and compared against, known and standardized dimensional, topographical and tonal references, thereby standardizing the captured data to known predefined standards for all image capturing devices.

Figure 3:
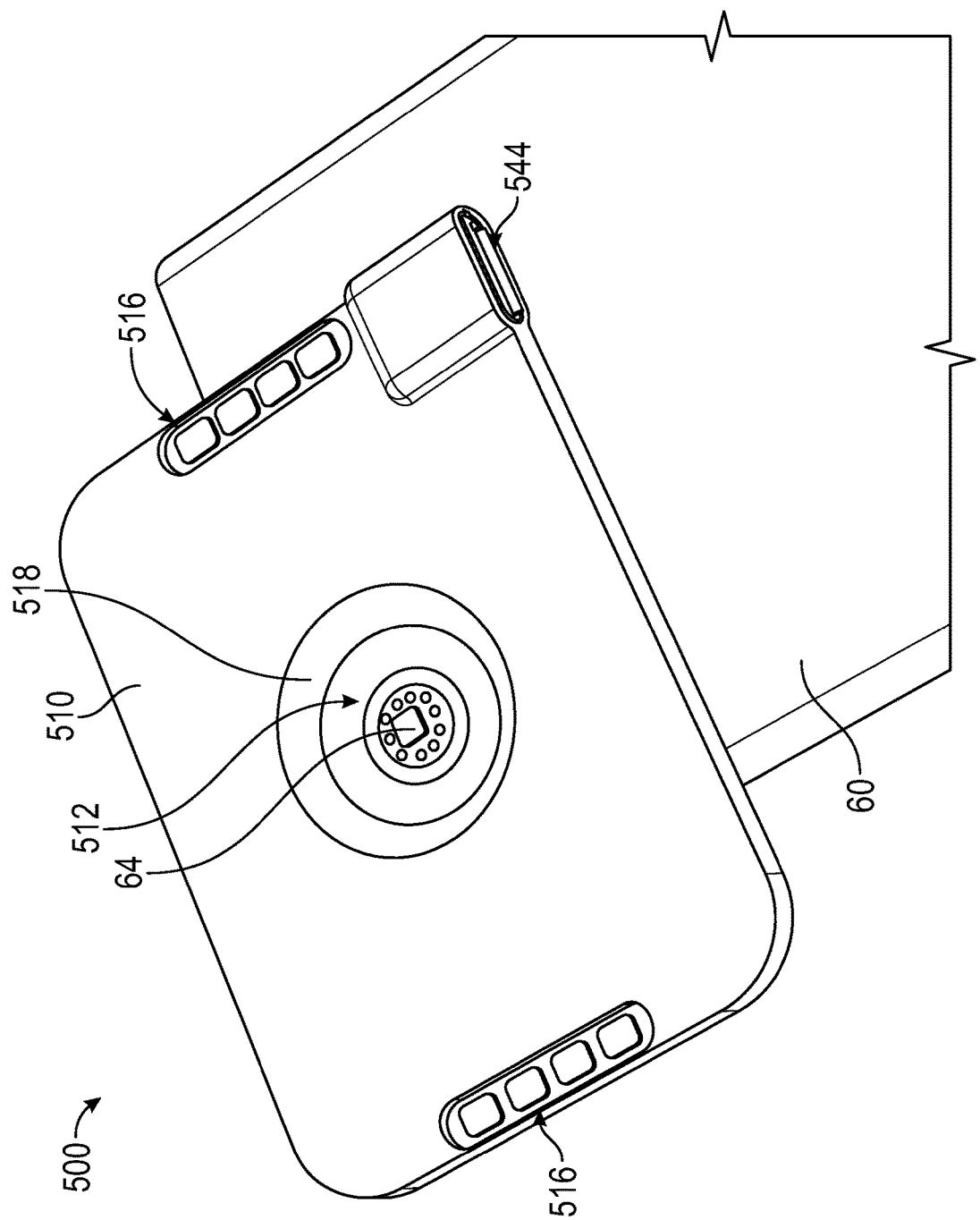
FIG. 3 is a front, perspective view of an auxiliary apparatus for a digital imaging device, according to another embodiment of the present invention.

With reference to FIGS. 3-6, an auxiliary apparatus 500 for a digital imaging device such as a smartphone or tablet according to yet another embodiment of the invention is shown. As illustrated therein, the auxiliary apparatus 500 is generally rectangular in shape and includes a body portion 510 having a window 512 designed to be positioned over a camera lens (e.g., lens 64) of a digital imaging device, such as smartphone 60. In the preferred embodiment, the auxiliary apparatus 500 is intended to be about the size of a business card or smaller, is thin enough so as to easily fit in a pocket or in a credit card slot in a purse, and includes a resilient clip 514 on the back of the body portion 510 that allows for removable coupling of the apparatus to a smartphone or other digital imaging device. In an embodiment, the clip 514 includes a sliding mechanism, allowing the clip 514 to extend, enabling the apparatus to work with phones or tablets that have camera lenses positioned in various locations. As shown in FIG. 3, the auxiliary apparatus, on its front face, includes a plurality of illumination sources or elements 516. For example, in an embodiment, the illumination elements may be LEDs, although other illumination means may also be utilized without departing from the broader aspects of the invention.

In an embodiment, the illumination elements 516 may be arranged in stacked arrays or rows on opposing sides of the body portion 516 and, in any case, are arranged around the window or aperture 512. In an embodiment, the LEDs 516 may be placed around the entire perimeter of the apparatus 500, and/or could be placed anywhere on the front surface of the apparatus 500. In yet other embodiments, the illumination elements 516 may additionally, or alternatively, be placed on the sides, top or bottom edges of the apparatus 500. The illumination elements 516 may be set in the apparatus 500 at different angles so that different combinations of illumination elements may be selectively activated/turned on to precisely control the angle of light illuminating a target surface, as described below.

In the preferred embodiment, the illumination elements 516 are physically set in the body portion 510 at various angles, depending on their predetermined function (i.e., so as to illuminate the surface from differing angles to highlight surface characteristics, or to illuminate the surface with various light temperatures to facilitate the subsequent measurement of surface hue, saturation and brightness values by the digital imaging device 60). The illumination elements 516 may be positioned and angled to push light at varying degrees from 0° all the way to 90°. In addition, the illumination elements 516 may have varying light emission angles, and may be selected and positioned because they emit light at the needed angle even though they're physically positioned and attached in a straight up and down position (i.e., perpendicular to the front surface of the apparatus). In the preferred embodiment, the illumination elements 516 are configured to emit light in a multitude of colors covering some or all of the entire spectrum, including the UV spectrum. Alternatively, the illumination elements 516 may all be configured to emit the same or varying color temperatures, in which case color filters may be positioned in front of the illumination elements 516 to enable emission of various light color temperatures on a target surface. In any case, the auxiliary apparatus 500 (through the use of differing illumination elements, or various filters) is configured to emit light in in a multitude of colors covering some or all of the entire spectrum, including the UV spectrum.

Figure 4:
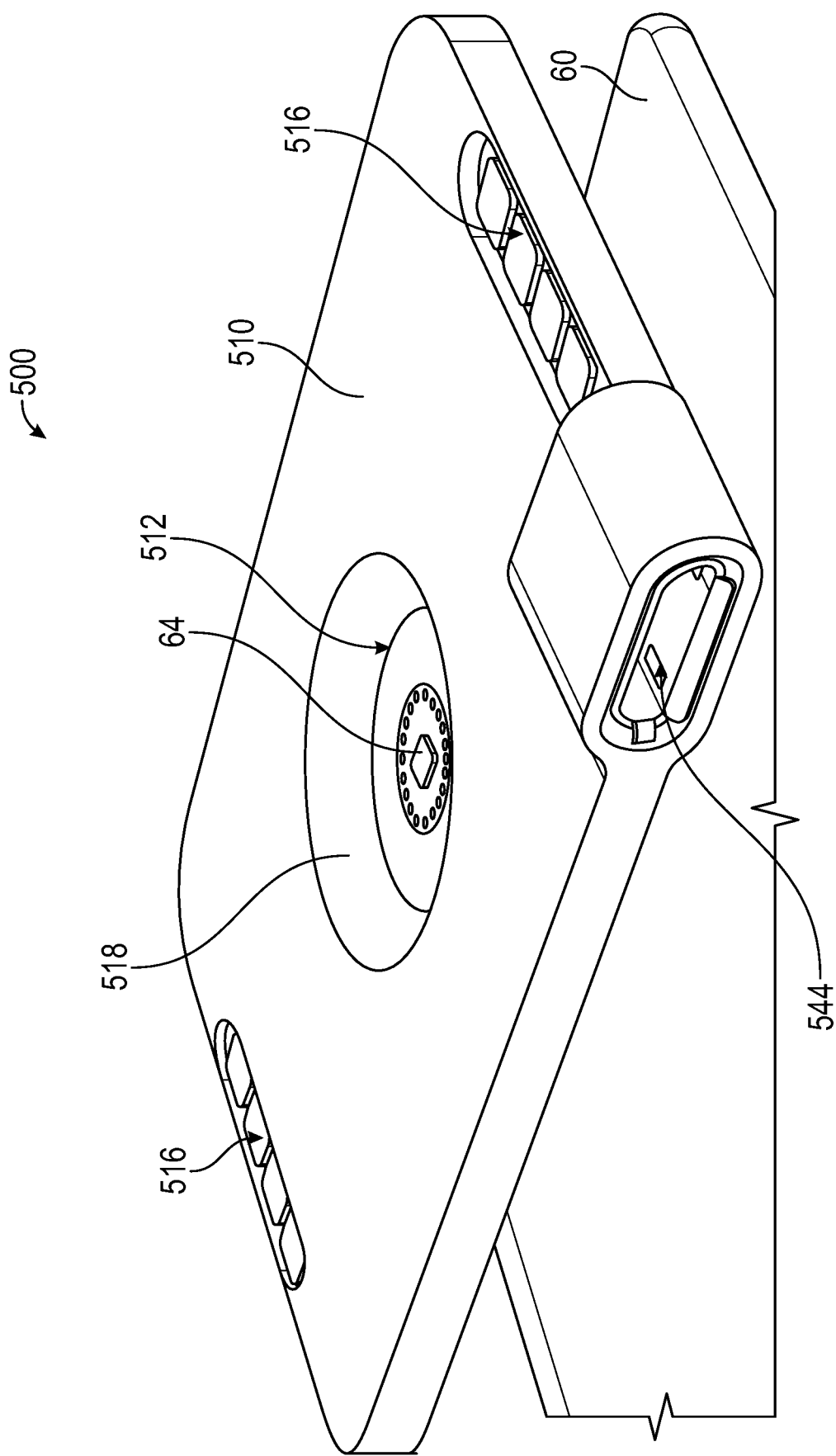
FIG. 4 is another front, perspective view of the auxiliary apparatus of FIG. 3.
Figure 6:
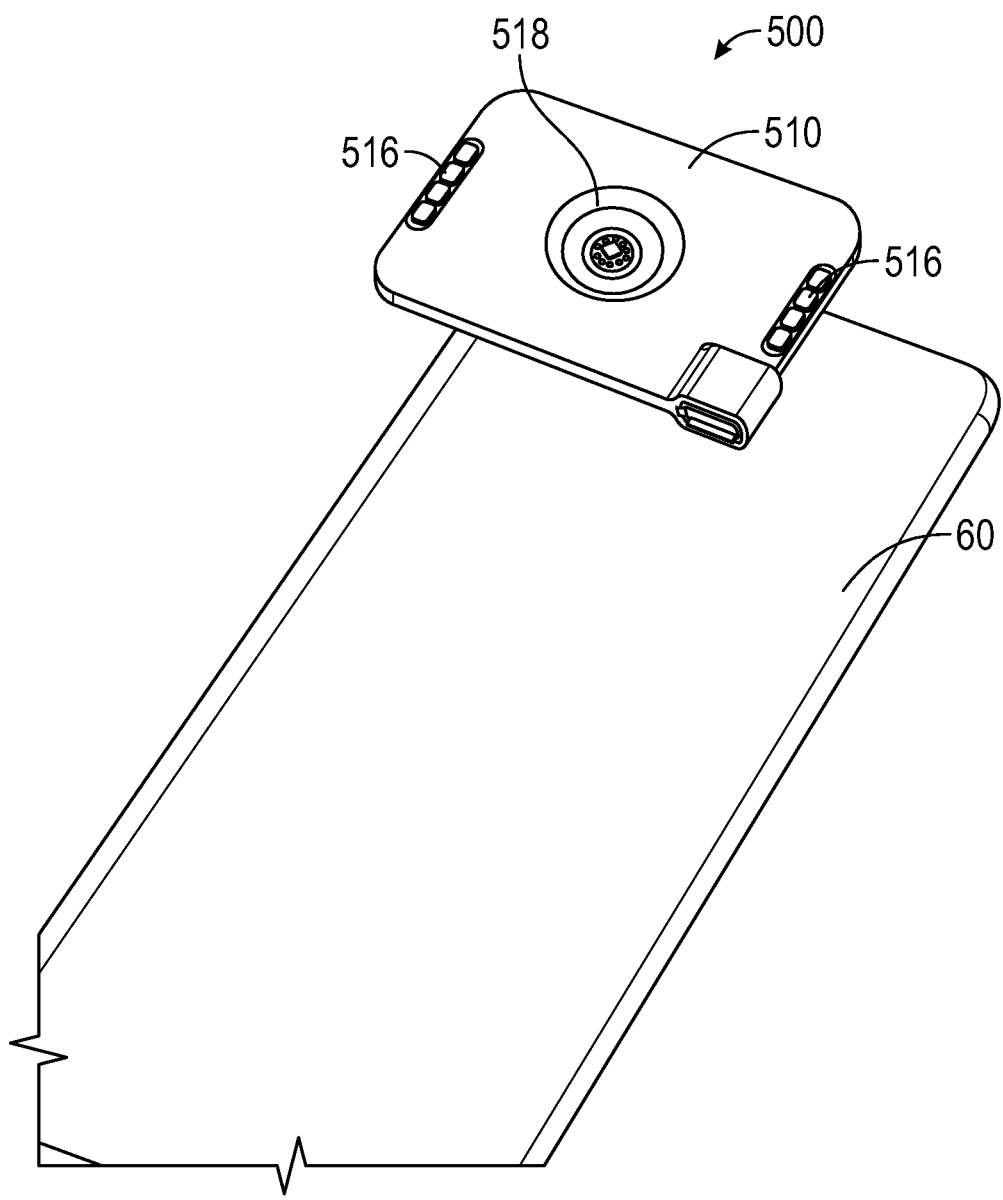
FIG. 6 is another front, perspective view of the auxiliary apparatus of FIG. 3.

As best shown in FIGS. 3, 4 and 6, in an embodiment, the window or aperture 512 is peripherally bounded by a light refractor in the form of a ring 518 of semi-transparent material that allows light to pass through it. The light refractor is configured to catch light and route it to a light sensor, as described below. The window 512 is intended to be just large enough to allow the camera flash (not shown) of the digital imaging device 60 to remain uncovered by the auxiliary apparatus 500. While FIGS. 3, 4 and 6 show the ring 518 as a frusto-conical shape having a larger diameter at a plane defined by the front of the device (opposite the rear surface of the digital imaging device 60), in an embodiment, the ring 518 is frusto-conical in shape such and has a larger diameter at the plane defined by the surface of the device that contacts the rear surface of the digital imaging device 60. The latter configuration forms a small captive and shaded area, in which the light from the camera flash is more contained and concentrated when the camera flash fires, making it easier to manage the sensitivity of the light sensor behind the semi-transparent material, as discussed below. In an embodiment, the ring of semi-transparent material 518 is large enough in diameter to cover various phone or tablet camera flash locations.

Figure 7:
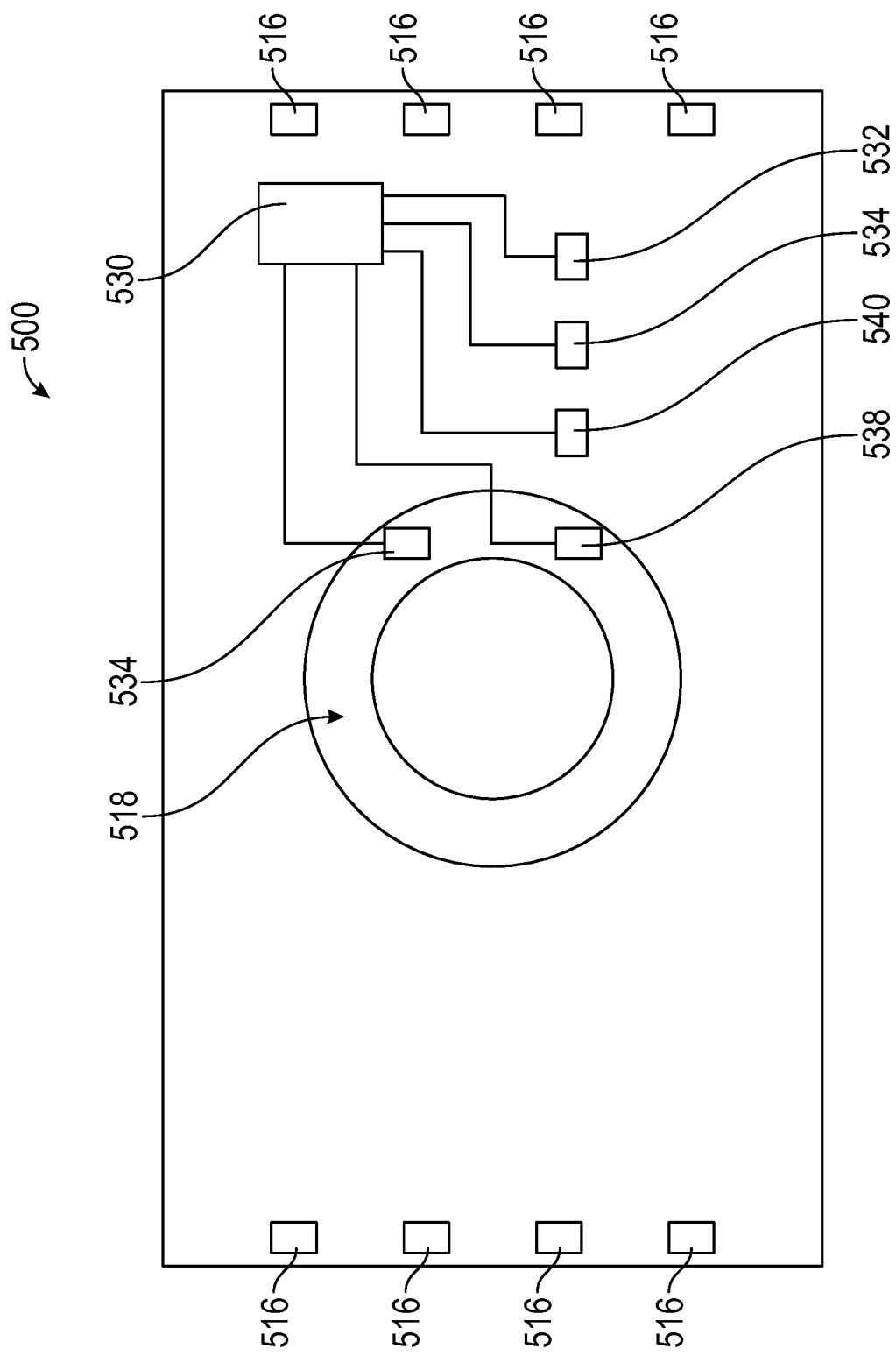
FIG. 7 is a schematic illustration of the internal components of the auxiliary apparatus of FIG. 3.

With reference to FIG. 7, a schematic illustration of the internal components of the auxiliary apparatus 500 is shown. As illustrated therein, the auxiliary apparatus 500 includes a microprocessor or controller 530 operatively connected to, and in communication with, the various illumination elements 516, as well as an embedded haptic vibration generator 532 (e.g., a vibration motor) and a mechanism such as a microphone and/or speaker 534 for detecting and/or generating an audible tone. Accordingly, the auxiliary apparatus 500 is configured to generate at least one of, and preferably each of, haptic vibration signals, light and sound, for the purposes discussed below. Moreover, the auxiliary apparatus 500 also includes a distance sensor 536, a light sensor 538 and a haptic vibration sensor 540, such as an accelerometer. Accordingly, the auxiliary apparatus 500 is configured to sense at least one of, and preferably each of, haptic vibrations, light and sound, for the purposes discussed below. As shown in FIG. 7, in an embodiment, the light sensor 538 and/or distance sensor 536 may be positioned behind the transparent material of ring 518.

In embodiments where the ring 518 is included, the ring of semi-transparent material 518 is large enough in diameter to cover various phone or tablet camera flash locations. As alluded to above, just behind the transparent material of ring 518 surrounding the lens opening 512 is a light sensor 538. Behind the light sensor is a ring of reflective material that scatters light. The scattered light is needed if/when the light sensor 538 is positioned on the other side from where the camera flash is located. The scattered light is bounced around and directed so as to provide a volume of light that can be detected by the light sensor 538. In particular, the light sensor (in conjunction with the reflective material) is designed to sense when the camera flash fires, sending light through the semi-transparent material 518.

As discussed in detail hereinafter, the auxiliary apparatus 500 employs a novel manner of communicating with the associated digital imaging device that does not rely on traditional communication methods such as Bluetooth or other near field communication protocols. This novel communication mechanism facilitates the use of the auxiliary apparatus 500 to control the ambient environment around the apparatus 500 and a target surface during image capture without contacting the target surface. In particular, the auxiliary apparatus, through the communication method described hereinafter, enables the apparatus 500 to light the target surface and the environment surrounding it in a highly stable, consistent and dimensional manner, thereby providing the digital imaging device (e.g., smartphone 60) the ability to capture data of the target surface very precisely and accurately.

In operation, the auxiliary apparatus 500 is attached to a digital imaging device such as a smartphone 60 so that the aperture or window 512 is in alignment with the lens 64 of the smartphone. A user is then able to view the target surface through the screen on the digital imaging device as is customary. When a user positions the auxiliary apparatus 500 at a predetermined/preset height from a target surface as sensed by the integrated distance sensor 536, e.g., approximately 50 millimeters, the microprocessor 530 activates the vibration motor 532 to generate a haptic vibration (which is set to a particular frequency). In an embodiment, the vibration may be a single vibration, or a plurality of vibrations of the same or different frequencies. This vibration does two things: (1) it lets the user know that the digital imaging device 60 is positioned at the correct distance from the target surface to be capture/analyzed, and (2) the vibration frequency is sensed by the on-board accelerometer/haptic vibration sensor in the digital imaging device 60. Upon sensing the vibration from the auxiliary apparatus 500, the controller/microprocessor in the digital imaging device triggers the camera exposure (or multiple exposures) to begin. Just prior to the digital imaging device initiating these exposure(s), the digital imaging device also generates a vibration through its on-board vibration/haptic signal generator. This vibration is sensed by the haptic vibration sensor 540 of the auxiliary apparatus 500. This then triggers the auxiliary apparatus 500 to begin its sequence illuminating various illumination elements 516 to correspond with the exposure(s) happening from the digital imaging device.

In another embodiment, rather than automatically initiating the exposure sequence when the digital imaging device detects the vibration generated by the auxiliary apparatus 500 when the apparatus 500 is positioned at the target distance from the target surface, the vibration generated by the auxiliary apparatus 500 may be utilized to prompt a user, through a software application running on the digital imaging device, to manually initiate the exposure sequence, such as by manually pressing on a button on a screen of the digital imaging device. As with the process described above, prior to carrying out this exposure sequence, the digital imaging device generates a vibration which is sensed by the auxiliary apparatus 500 which, again, triggers the auxiliary apparatus to begin its preprogrammed illumination sequence (i.e., illuminating various lights/illumination elements 516 to correspond with the exposure(s) happening from digital imaging device.

In this manner, the auxiliary apparatus 500 is configured to communicate with the digital imaging device without the need for bulky and expensive NFC or Bluetooth communication components. As discussed above in connection with FIGS. 1 and 2, the auxiliary apparatus 500, importantly, is configured to emit a volume of light with enough intensity and volume to negate the detrimental effects of the ambient environment around it.

In an embodiment, the auxiliary apparatus 500 may include a rechargeable battery (not shown) or connector port 544 for connection to a supply of electrical power for recharging.

As described above, the auxiliary apparatus 500 incorporates a distance sensor 536 and a vibration mechanism 532. This allows a user to consistently be prompted with a buzz, i.e., haptic vibration, when the apparatus 500 has been positioned at the proper height from the target surface. In other embodiments, this notification can alternatively, or additionally, be achieved by emitting an audible alert through mechanism 534, or a light flash using illumination elements 516. For example, in such an embodiment, when a user positions the auxiliary apparatus 500 at the proper height from a target surface for which surface property data is to be acquired, an audible tone would be emitted, informing the user that the device is at the proper height, as well as prompting the sound listening capabilities of the digital imaging device to respond as programed.

Indeed, while the embodiments described above contemplate using haptic signals, e.g., vibrations, to communicate between the auxiliary apparatus 500 and the digital imaging device, and to signal to a user that a predetermined target height from a target surface is achieved, audible (sounds) and/or visual (light flashes) signals may alternatively, or additionally, be utilized as a means of communication between the auxiliary apparatus 500 and the digital imaging device. For example, in an embodiment, when a target distance for image capture is achieved, the auxiliary apparatus 500 may generate a vibration, sound or flash, which is sensed by the digital imaging device. The digital imaging device may then generate a sound, vibration or flash, which is sensed by the auxiliary apparatus, and used as a cue to initiate the illumination sequence. For example, in an embodiment, just prior to carrying out the exposure(s), the digital imaging device may generate a flash, which is directed by the ring 518 to the light sensor 538. In this manner, a light flash is used to initiate the illumination sequence.

In another embodiment, the digital imaging device lens autofocus data may be monitored and utilized as a basis for the exposure and/or illumination sequence. When the user lowers the auxiliary apparatus 500 (clipped or attached to the digital imaging device) over the target surface to be captured, the camera autofocus data provides a reliable reference point at which the image area is in focus. As the camera autofocus lens data is monitored or analyzed to determine that this point has been achieved, the lighting/illumination sequence of the auxiliary apparatus 500 may be triggered to begin through vibration, sound or light cues originating from the digital imaging device and sensed by the auxiliary apparatus 500, and an exposure to capture an image may be automatically carried out by the digital imaging device. While this may not always be at the exact same height for each exposure and/or between camera to camera, it is consistent enough that this method provides very accurate and consistent surface data capture, and eliminates the need for the user to manually initiate the exposure and lighting sequence. In addition, this improvement, in some embodiments, may eliminate the need for the vibration motor that is incorporated into the auxiliary apparatus 500.

Similar to the above, in yet another embodiment, the auxiliary apparatus 500 may be utilized in conjunction with a housing (e.g., an open-ended cone) or disk, such as disk 414 of FIGS. 1 and 2, containing reference indicia, such as one or more digital reference marks 413. When the housing is positioned over any surface, and when the camera 64 sees that the specific reference marks on the housing or disk 414 are at a certain size and within a certain angle, the apparatus 500 is assured to be in position to provide the adequate volume of light to negate the ambient light contamination, as well as at the correct height to ensure that the light emitted from the illumination elements 516 is at an approximately a 45° angle. As discussed above, because the phone camera lens can be back farther from the surface and because there is no cone, the overall area captured is much larger, with much more surface area for which to calculate the three dimensional properties of the surface being measured.

Further to the above, in operation, the digital imaging device and processor thereof may be configured to initiate an exposure to capture an image if/when the reference indicia on the disk are in the image area/field of view (and when they come into focus). Because the reference indicia are of a known size and shape, these could then be used by the digital imaging device to calculate the dimensional portion of the surface property data.

In addition to using the illumination elements 516 to effectively 'cancel out' the ambient light, the size and shape of the device may also be chosen to block some portion of the ambient light from direct overhead lighting. This works in conjunction with how far the apparatus 500 is positioned from the measured surface. In an embodiment, it is also contemplated that a magnification lens may be positioned over the window 512 to better control and reduce the height at which the apparatus 500 needs to be positioned from the target surface. Importantly, the auxiliary apparatus 500 is configured to function without any form of cone or shroud to physically block the ambient light environment surrounding the apparatus 500.

As described below, the auxiliary apparatus 500 of the present invention manages the consistent height and the emission angle of the light being emitted on the target surface, as well as tightly controls the volume of light hitting the target surface. Indeed, the light needs to be controlled at a specific and controlled height from the surface, light angle and light volume to adequately negate the effects of the ambient light contamination reflecting on the target surface. If the apparatus 500 is positioned too high or too low from the target surface, the lighting angle and light intensity is altered, negating the ability obtain accurate and consistent results. If the lighting volume is too low, the ambient environment is not diluted enough to minimize the effects of the ambient environment. If the lighting volume is too much, the camera chip is over exposed and the ability to capture a full range of image surface data is inhibited. These deviations in lighting volume may be a result of various factors, including, simply, a user trying to hold the device steady in mid-air during image capture. Accordingly, the present invention contemplates a number of solutions to the problem of inconsistent and/or sub-optimal positioning of the digital imaging device form a target surface (and resultant over- or under-illumination), as described below.

In particular, in addition to using the distance sensor 536 and vibration mechanism 532 to provide a tactile indication of when the optimal distance from a target surface is achieved for image capture, data acquired by the distance sensor 536 can be used to help account for and correct inherent variations in the actual distance of the digital imaging device from the target surface just prior to, or at the time of, illumination and exposure of the target surface (as compared to the ideal/optimal distance of the digital imaging device from the target surface).

One method of accounting for any variation in the distance of the digital imaging device from the target surface involves a post-exposure (i.e., post image capture) correction of the captured digital pixel data. With this method, the height data obtained using the distance sensor 536 can be used by the digital imaging device to calculate an increase or decrease of the values of the captured digital pixel data, after the exposures/images have been captured and stored. For example, the captured pixel data may include characteristics such as hue, saturation, brightness and/or dimensional data. In an embodiment, the height data obtained by the distance sensor 536 during illumination and image capture can be utilized in a post-image correction step whereby the pixel data can be altered to add more or less hue, saturation and/or brightness depending on whether the apparatus 500 was positioned above or below the optimal position at the time of illumination and image/data capture. In addition, such height data can be utilized to better calculate the actual angle of illumination. With this method, the height/distance data gathered by the distance sensor 536 is communicated or transmitted to the digital imaging device to determine and implement the post-exposure image corrections. In particular, the distance data is communicated by the auxiliary apparatus 500 to the controller/microprocessor of the digital imaging device, immediately after exposure. In this case, the auxiliary apparatus 500 sends out a haptic vibration(s) (or different frequency buzzes, or lights, or sound), which is sensed by the accelerometer (or light sensor or microphone) of the digital imaging device, communicating to the processor of the digital imaging device the exact height from the target surface at time of exposure. Once the corrections to the pixel data are implemented, the corrected image may be stored on the digital imaging device. In addition to the above, importantly, the ability to realize and calculate for the variance of light angle allows for more accurate measurements of distance, like measuring the length and intensity of cast shadows from topographical changes in the surface and differences in the lengths of image intensity shift.

Another method of accounting for any variation in the distance of the image capture device from the target surface involves using the height/distance data obtained by the distance sensor 536 to calculate an actual, real-time adjustment of the light volume of the illumination elements 516 and/or the angle of light by controlling which illumination elements (which are set at different angles in the housing) are illuminated, before, and during, image capture/exposure. During the small time duration of exposure, the user is inevitably moving their hand up and down some amount. With this method, regardless of the distance, the auxiliary apparatus 500 and/or digital imaging device is placed from a target surface, the volume and/or angle of the light emitted by the illumination elements 516 will be automatically adjusted so that the appearance of the target surface remains consistent. In particular, in operation, as the proximity/distance sensor 536 generates the device height distance data (from the target surface), this data is used by the microprocessor 530 to calculate an increase or decrease in the power of the illumination elements 516 which is implemented in real-time or near real-time, thereby increasing or decreasing the volume of the light illuminating the target surface. In particular, the distance sensor of the apparatus 500 sends data back to the microprocessor, which in turn increases or decreases power to the illumination elements 516 to increase or decrease light intensity, in effort to make sure the light volume being applied to the target surface being captured remains highly consistent and repeatable. In this respect, the volume of light emitted by the auxiliary apparatus 500 of the present invention is directly dependent on the distance of the apparatus from the target surface. As used herein, "real-time" means instantaneous or nearly instantaneous streaming or transmission of data or information, such that as the digital imaging device and apparatus 500 are moved slightly with respect to the target surface, the intensity, angle and/or volume of light generated by the illumination element(s) is adjusted nearly instantaneously, or at the least, without noticeable lag. In an embodiment, the light may be adjusted at a rate of approximately 1,000 times per second.

For example, if a user positions the digital imaging device closer to the target surface than the optimal distance/height, the proximity sensor data acquired by the distance sensor 536 is used to determine the amount by which the light volume/intensity needs to be reduced to ensure the correct and consistent volume of light, at the correct angle, is hitting the target surface. Likewise, if the user is positioning the digital imaging device further away from the target surface than is optimal, the apparatus 500 calculates the increase in the amount of light volume needed to account for the light falloff that occurs as the apparatus 500 get further away from the target surface. In this way, a user can position the digital imaging device at varying heights from the target surface, and still produce accurate and consistent data results and ensure that the same level of ambient light is controlled consistently. Accordingly, a certain degree of 'play' is allowed, obviating the need for a user to hold the digital imaging device and apparatus 500 completely steady to capture an accurate image, thereby increasing the ease of use of the system as a whole.

It is contemplated that these two methods of accounting for variations in the height of the digital imaging device from the optimal height may be coupled with the vibration cue/prompt mechanism described above, although either of these methods may be utilized independent of such vibration feature. Notably, when using either of these two methods to account for variations in height of the device from the target surface, the vibration cue/prompt is not necessary, but can be used solely as a reminder to the user of the ideal height in which to position the digital imaging device from the surface (i.e., this would only be a useful user reference, and not used to signal the exposure sequence).

In addition to the above, in an embodiment, the light sensor 538 can be used to determine if/when there is actually too much ambient light (i.e., light that cannot be effectively negated with the illumination elements 516). When this happens, the microprocess is programmed to actuate the vibration mechanism 532 to send a specific signal to the smartphone accelerometer, so the software/application can tell the user to reduce exposure to the ambient environment and/or shield the ambient environment slightly with their hand or some other item to reduce the ambient contamination. In other embodiments, the distance sensor 536 may be configured as a light sensor which can be utilized to determine how much ambient light is present, for the purpose described above.

As described above, in an embodiment, the flash of the digital imaging device (e.g., the flash 64 of a smartphone 60) can be utilized as a means of communicating with the auxiliary apparatus 500. In particular, the auxiliary apparatus 500 incorporates light sensor 538 enabling the auxiliary apparatus to receive communications from the smartphone 60 through light flashes to do things like commence light exposure and any other possible function of the device.

In an embodiment, the light sensor in the auxiliary apparatus 500 may be omitted in favor of, or supplemented with, an accelerometer sensor (e.g., haptic vibration sensor 540) as a means of communication with the digital imaging device. In particular, to communicate with the vibration sensor 540, the vibration motor function incorporated into smartphones and tablets can be utilized and controlled. In particular, this method functions substantially similarly to the phone flash and light sensor method described above, only the phone or tablet vibration motor is controlled to trigger the vibration sensor 540 incorporated into the auxiliary apparatus 500. When the vibration sensor 540 of the auxiliary apparatus 500 senses the proper vibration, it triggers the microprocessor 530 to conduct one or multiple functions such as illumination of the target surface.

In an embodiment of the present invention, it is envisioned that the auxiliary apparatus 500, rather than being configured to clip onto a smartphone 60, the surface auxiliary apparatus 500 may instead be integrated into a case for the smartphone or other device. In this respect, the phone case itself would become the auxiliary apparatus 500. One modification to accommodate this implementation would be that on phones where the camera lens was set to one corner, like Apple phones, some or all of the illumination elements would be required to flip out and extend away from the case body during the time in which the surface was being measured. When finished, the lights would snap back into to the case. In yet other embodiments, it is contemplated that the auxiliary apparatus 500 may be removably connected to a digital imaging device through a magnetic coupling, Velcro, adhesive or other means.

As discussed above, the auxiliary apparatus of the present invention therefore facilitates or enables existing digital imaging devices like tablets and smartphones to capture, measure and process surface property characteristic data (including hue, saturation and brightness) of a target surface to an extent that has heretofore not been possible due to contamination by ambient lighting conditions and the inability to precisely control the light illuminating a target surface to eliminate the distorting effects of ambient light. As described above, the auxiliary apparatus communicates with the associated digital imaging device through vibrations, sounds and light (originating from and/or received by the auxiliary apparatus), and controls the ambient environment around the apparatus to eliminate the detrimental effects of ambient light on the target surface without contacting the target surface. In particular, the auxiliary apparatus is configured to produce precisely positioned and spectrally segmented lighting, which is utilized to illuminate the target surface in a highly stable, consistent and dimensional manner before and/or during exposure/image capture. Accordingly, the auxiliary apparatus provides the digital imaging device with the means by which to capture accurate and consistent surface property data (including, for example, dimensional, topographical and tonal properties) within the images it takes in ways that have heretofore not been possible, so that the digital imaging device can then process and measure that captured surface property data.

In contrast to existing devices and methods for acquiring surface property data from a target surface, the auxiliary apparatus of the present invention is able to effectively negate and/or eliminate the negative and inconsistent effects of ambient light on the target surface without the use of a shroud or cone, and without contacting the target surface. The auxiliary apparatus is therefore particularly suited for use in the capture of surface property data from surfaces that are detrimentally altered by the effects of being touched, or are required to be hypoallergenic (for example, skin, wet or sticky surfaces, material or carpet pile, blood, etc.).

The advantages described above are primarily enabled by the use of distance sensor 536 in the auxiliary apparatus 500. In particular, data acquired by the distance sensor 536 and communicated to the microprocessor 530 is utilized by the microprocessor 530 to calculate the angle, amount, volume and/or intensity of light needed to be produced by the array illumination elements 516 to negate the effects of ambient light. As a user captures images of a target surface, the digital imaging device they are holding will fluctuate in distance from the target surface. In one embodiment, using the distance sensor data acquired by the distance sensor 536, the lighting intensity/volume may be automatically increased or decreased (via microprocessor control of the illumination elements) before and/or during the exposure(s) to account for the increase or decrease of light on the target surface due to the digital imaging device being closer or farther away from the surface being captured. This distance sensor data can also be used to correct the exposure of the image data in post capture processing, as described above.

Moreover, the distance sensor data acquired by the distance sensor 536 may be utilized by the microprocessor 530 to notify and alert the user that they have positioned the digital imaging device at the proper distance from the surface. In particular, as the user lowers the digital imaging device (and associated auxiliary device) closer to the target surface, the distance data is used by the microprocessor 530 to initiate a user prompt that they have reached the optimal distance from the target surface. This prompt can be a sound, a flash of light or a haptic vibration, or even some type of textual message from the auxiliary apparatus of the digital imaging device.

In stark contrast to existing systems and methods which rely on Bluetooth and/or other near field communication means, the auxiliary apparatus and the digital imaging device, as discussed above, communicate through one or more of light, sound or haptic vibration signals, which is less cumbersome, more reliable and much less expensive.

Figure 8:
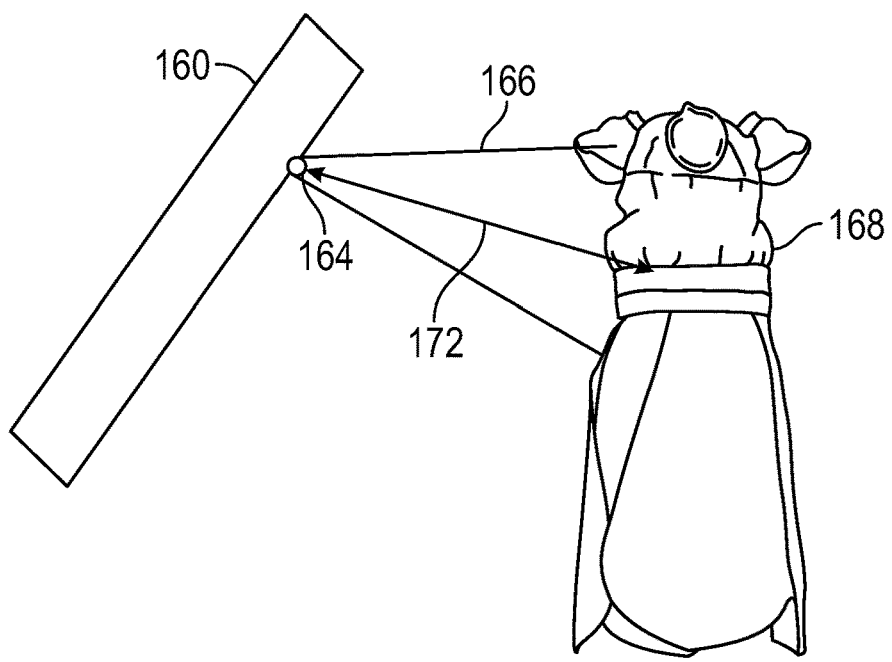
FIG. 8 is a simplified schematic illustration of a digital imaging device, in accordance with one embodiment of the present invention.

Referring now to FIG. 8, in an embodiment, the ability to effectively determine a target distance from a target surface to be imaged, and to generate a precise amount of light to negate or eliminate the effects of ambient light on the target surface, may be integrated into stand-alone digital imaging device (also referred to hereinafter as a surface property capture and measurement device), such as a smartphone 160. The smartphone 160 may include one or more ambient light sensors 162 (best seen in FIG. 9) which are operative to provide measurements of one or more properties of the ambient light in the surrounding environment, e.g., articular wavelength, intensity, and/or other properties which may affect data gathered by a camera 164 integrated into the phone 160. As used herein, the term "surrounding environment" refers to the physical environment to which the field of view 166 of the camera 164 is exposed. The one or more ambient light sensors 62 may be integrated into the phone 160. As will be appreciated, however, in embodiments, the ambient light sensors 162 may be disposed in a separate case, e.g., a cell phone protective case, that fits over the phone 160.

As will be understood, integrated software within the phone 160 may then compensate data gathered by the camera 164 based at least in part on the one or more properties of the ambient light as measured by the ambient light sensors 162. Thus, such embodiments of the present invention provide for the ability to harmonize uniform light evaluation results between a plurality of separate digital imaging devices without the need for a light-tight environment and/or a light shroud, e.g., a cone attached to the phone 60, and/or case that surrounds the sensors 162 so as to reduce and/or completely block out ambient light from the field of view of the sensors 162.

In embodiments, the phone 160 may further include one or more light sources 167, e.g., LED flash devices, which may be utilized to flood the field of view 166 with light so as to saturate the ambient light received by the camera 164. In other words, the light source 167 may push an amount of light towards an object imaged by the camera 164 so that the pushed light reflects off the object such that the amount of reflected light, pushed from the light source 167 and received by the camera 164, allows the integrated software within the phone 160 to compensate data gathered by the camera 164 as discussed herein. In some embodiments, the light source 167 may generate a ring of reflected light from an object imaged by the camera 164. As will appreciated, embodiments of the invention that include the light source 167 may not require the use of a light shroud (e.g., an open-ended cone or housing, as described above) to adequately compensate the data gathered by the camera 164, as discussed hereinafter. In some embodiments having the light source 167, however, a light shroud may still be required, but at a reduced size.

Further, the integrated software within the phone 160 may employ a model that accounts for the physical properties, e.g., texture, reflection, transparency, and/or translucency, of an object 168 imaged by the camera 164. For example, the integrated software may be able to determine the physical properties of the imaged object 68 via analyzing the data gathered from the object 168 via the camera 164. Additionally, the phone 160 may provide for a command line and/or graphical user interface ("GUI") through which a user of the phone 60 may provide data concerning the physical properties of the imaged object 68 to the integrated software.

Figure 9:
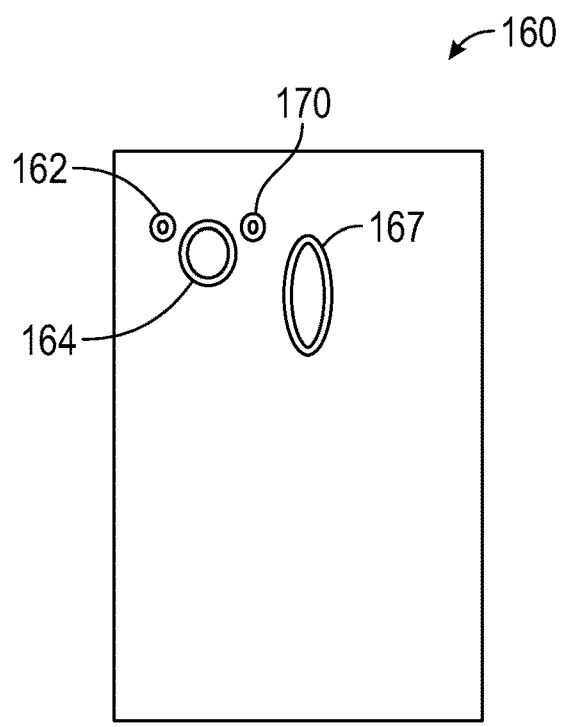
FIG. 9 is a rear view of the digital imaging device of FIG. 8.
Figure 10:
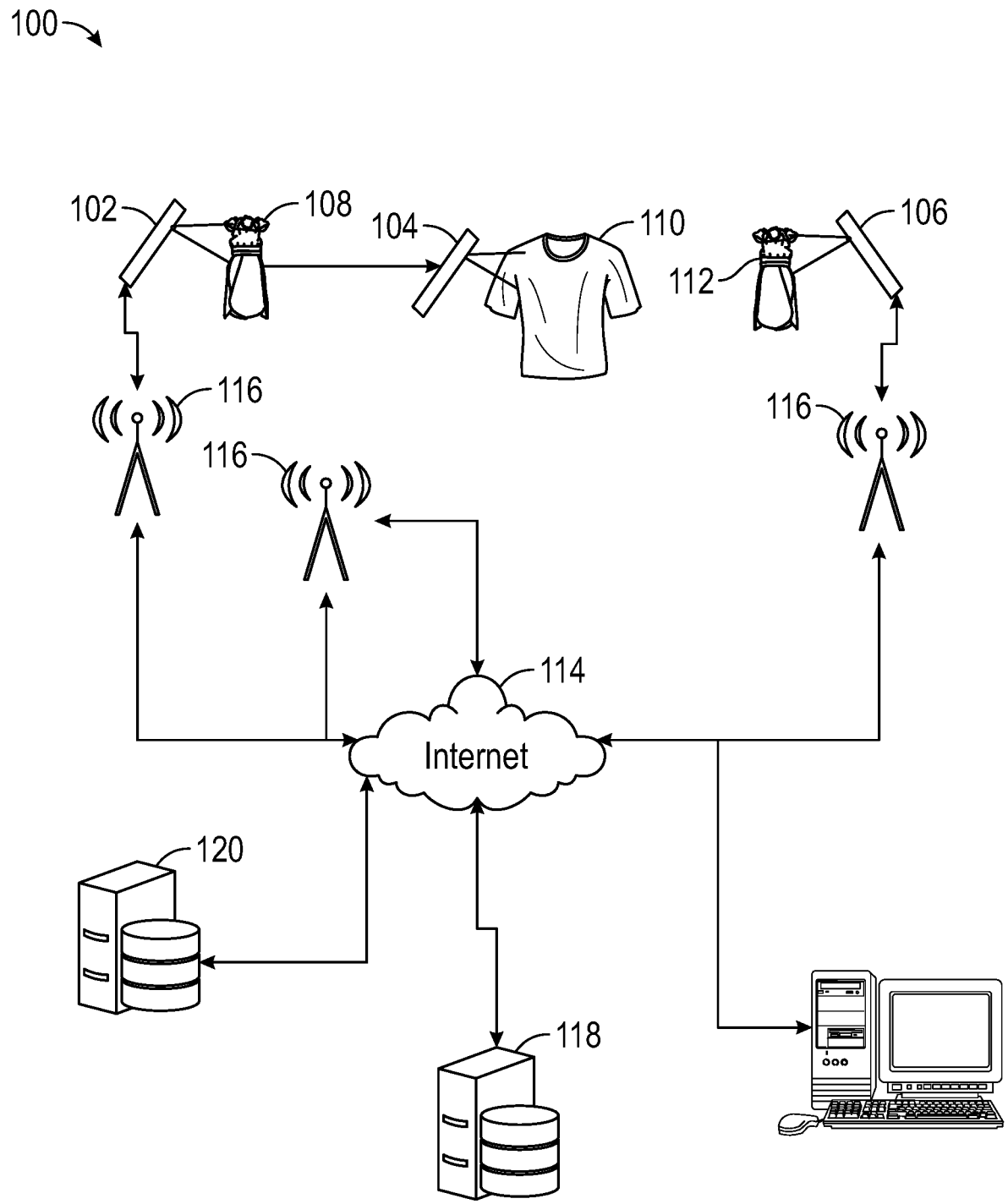
FIG. 10 is a schematic illustration of a computerized system for use with the digital imaging device of FIG. 8, in accordance with one embodiment of the present invention.

As further shown in FIGS. 8 and 9, the phone 160 may also include a distance sensor 170 operative to measure a distance 172 between the cameral 164 and the object 168 to be imaged. The distance sensor 170 may determine/measure the distance 172 based at least in part on one of electromagnetic rays, e.g., x-rays, lasers, radar; sound waves; an autofocus feature of the camera 164; and/or by physical means, e.g., an extended probe/stick. In certain aspects of the invention, the phone 160 may generate/provide an indication to a user of the phone 160 that the camera 164 is at least one of too far from the object 168, within an acceptable range of the object 168, and/or too close to the object 168 with respect to the ability of the ambient light sensors 162 to provide data sufficient to allow the integrated software to accurately compensate data gathered by the camera 164 for the ambient light in the surrounding environment.

Further still, in embodiments, the camera 164, in conjunction with a processor of the phone 160, may be operative to detect and correct for surface glare arising from the object 168. For example, the object 168 may have specular highlights, which while not necessarily readily visible to a human eye, may be captured by the camera 64 so as to affect the camera's 164 ability to obtain accurate data regarding one or more optical properties of the object 168. Accordingly, and as will be discussed in greater detail below, a processor within the phone 160 may be operative to detect specular highlights in an image captured by the camera 164, remove data corresponding to the specular highlights from the image, and replace the removed data. In embodiments, the processor may replace the removed data with interpolated color data from the non-removed data within the same image.

In connection with the embodiments described above, the measurement of samples that are not completely flat are also problematic for color measurement devices. This issue lies in how to deal with specular reflection. Specular reflection is the reflection of light that occurs at the surface of a sample, and as such, does not interact with the sample. As such, specular reflection is generally roughly the color of the incident light. It reflects from the surface as a billiard ball bounces from the bumper of a billiard table, which is to say, the angle of reflection is equal and opposite the angle of incidence.

Light which enters the sample and later exits is referred to as bulk reflection. Specular reflection views the surface at a microscopic level. A very smooth surface will tend to appear glossy, since directional light will specularly reflect in the same direction. When this happens, the human eye perceives the glossiness as a specular highlight. If the sample is a glossy magazine, many individuals will tend to orient the magazine so as to minimize the specular reflection. If the surface has a glossy surface at the microscopic level, but has texture when viewed at a larger scale, as in a blackberry or a car, the brain will discount the specular reflection when assessing the color of the object.

Conversely, a surface which is rough will tend to scatter the specularly reflected light so that the sample appears matte. An individual still viewing the specularly reflected light will no longer perceive that specularly reflected light as a specular highlight.

Numerous approaches have been taken to deal with measuring the light reflected from a sample. Some instruments have been designed to measure only the specular reflectance, while some have been designed to capture substantially all the reflected light, bulk and specular. Other instruments have been designed so as to measure predominantly the bulk reflection, while still other instruments have been designed so as to virtually eliminate specular reflection so as to measure strictly the bulk reflection. For example, in a gloss meter, the illumination and detection angles are equal and opposite. While this arrangement will capture both specular and bulk reflection, at shallow angles, the specular reflection will predominate and these measurements may serve as a process control parameter in the assessment of gloss.

In a reflection measurement device with diffuse geometry, the sample is presented to a sample port which is a hole at one end of a sphere. The inside of the sphere is coated with a very highly reflective and matte white coating. Such a device is known as an integrating sphere. A light is trained on one portion of the inside of the sphere. The light reflects in all directions, multiple times. As a result, the sample is illuminated equally from all directions. A sensor is generally positioned opposite the sample port, offset by 8°. While this may seem to be a device which only measures the light reflect at 8° from azimuth, the Helmholtz reciprocity principle states that illumination and detection can be reversed without changing the results. Thus, this arrangement is equivalent to light hitting the surface at 8° from azimuth and being sensed equally at all angles.

Color measurement instruments with diffuse geometry have gained acceptance in many industries, in particular for the measurement of paint. Since a substantial portion of the reflected light is measured, diffuse measurement devices are reasonably insensitive to differences in the texture of the surface to which the paint has been applied. As a result, the repeatability of the colorant formulation software is improved.

As will be appreciated, however, this does not necessarily mean that the visual appearance of the final product is more tightly controlled. In particular, the diffuse measurement condition will most accurately approximate the visual appearance of a measured sample under diffuse lighting, which may or may not be appropriate for the intended conditions where the painted sample is to be viewed. In general, measurements of a moderately glossy sample under diffuse lighting conditions will suggest a color that is less saturated and lighter than under more directed illumination.

One compromise is to blacken a portion of the inside of the integrating sphere which is at an opposite angle from the detection angle. In this way, the sample is not illuminated at an angle what would allow for measurement of glossy specular reflection. Such measurements are more closely correlated to visual appearance of moderately glossy samples.

The 45/0 geometry illuminates the sample at 45° from the azimuth and detection is done at the azimuth angle. This geometry has been standardized in the print industry where samples are generally flat. It has been found that this measurement condition is a reasonable approximation to how printed material is often viewed, so it provides a measurement which correlates well with visual appearance. Note that, as stated before, a glossy catalog will generally be oriented so as to minimize the specular reflection. Matte surfaces (such as standard office paper and newsprint) show less variation in geometry, since they approximate a Lambertian distribution, hence 45/0 geometry will produce measurements that are substantially similar to other geometries, especially diffuse with specular excluded.

Further the Helmholtz reciprocity principle states that 45/0 and 0/45 geometry will produce equivalent results such that the discussion hereinafter relating to 45/0 geometry applies equally well to 0/45 geometry. While light may be coming from one direction at 45°, it has been found to be advantageous to illuminate from multiple directions, or preferably with annular illumination, where light hits the sample in a cone. The 45/0 geometry, however, has proven to be problematic for printing presses that deliver ink that is still partially wet when delivered from the press. Such presses include cold set newspaper presses and sheet fed offset presses. If a sample is measured "hot off the press", the 45/0 reflectance will be substantially lower than after the sample has had time to dry. The reason for the change is that ink will tend to conform closer to the rough surface of the paper as it dries.

This drying process could be a matter of minutes, or in some cases several days. This is a problem where the measurements are to be used for real-time process control of the color on press. This application dictates timely measurements of the printed product, which is unfortunately the time when the color measurement is changing most rapidly.

One solution to this problem is the addition of cross polarized filters into a 45/0 geometry, in which one polarizing filter is placed between the illumination source and the sample. In this way, the sample is illuminated with polarized light. A second polarizing filter is placed between the sample and the detector. The second polarizing filter is rotated at 90° from the first so as to exclude any light which did not change polarization when reflected from the sample.

Since specular reflection does not change polarization, but bulk reflection (generally) randomizes the polarization, this arrangement will largely eliminate all specular measurements from the measurements. As a result, measurements made with a 45/0 device with cross polarized filters of a printed sample will change little as the ink dries.

As will be appreciated, the benefit of this geometry is that it makes process control much less prone to variation due to variations in sampling time. The measurement taken directly after printing will more closely match a measurement made two days later. The disadvantage is that that the visual appearance of the printed sheet will change over time, and the measurements will not reflect this. This is one instance where the aims of process control and of meeting customer expectations can be at odds with each other.

Color measurement with a 45/0 geometry with cross polarizing filters has surprisingly been found to have one application where it is favored because it is more directly correlated with visual appearance. This is in the measurement of paintings on canvas. It has been found that standard 45/0 geometry and diffuse geometries both give measurements which are indicative of a more washed out color, which is to say, the colors are less rich because the reflectance values are higher than what a human observer perceives.

The reason for the higher reflectance is that the threads that make up the canvas are generally coated with a glossy surface. Portions of the sides of these threads will present themselves at an angle where the specular reflectance is directed to the detector. The reason for the visual appearance of a lower reflectance (that is, a richer color) is that the brain will perceive the light from the sides of the threads as specular highlights, and will discount them from the assessment of color.

In summary, the diffuse with specular included geometry and the 45/0 geometry with cross polarizers both deliver consistent measurements irrespective of the smoothness of the surface, one by endeavoring to capture all of the specular reflection, and the other by endeavoring to eliminate all of the specular reflection. This consistency, however, comes by sacrificing some of the correlation to visual appearance.

While the determination of accurate digital data gathering has been discussed in connection with the embodiments shown in FIGS. 1-2, 3-7, and 8-10, it has been discovered that more accurate digital characteristic data can also be obtained by a careful analysis and compensation for glare, or spectral discontinuities, that may be present when collecting digital characteristic data of an item, as will be discussed in greater detail below.

Embodiment #1: XYZ Camera with Three White LEDs

In a first embodiment, the imaging device is a three-channel device wherein the three channels have a spectral response that is substantially close to the CIE tristimulus function, i.e. XYZ. The spectral response may alternately be designed so as to approximate the actual spectral response of the human eye, also known as LMS.

The light source may be, for example, a set of three white LEDs. They are preferably arranged in a ring around the measurement area of the sample so that light from all three impinges a flat sample surface at 45°. The white LEDs may be arranged 120° apart around the ring.

Alternately, there may be two, or more light sources. They may be of any other type of light source, e.g. incandescent, fluorescent, Xenon flash, or other gas emission light source. The spectral response of the channels may be modified so as to take into account the spectral emission of the light source.

Embodiment #2: B/W Camera with Bandpass Filters and Three White LEDs

In a second embodiment, the imaging device may be a black and white camera. A multiplicity of broad-spectrum light sources is filtered so as to selectively illuminate the sample with narrow bands of the visible spectrum. Said filters may, for example, be interference filters which illuminate the sample with light in the ranges 400 nm to 420 nm, 420 nm to 440 nm, etc., up to 680 nm to 700 nm.

Embodiment #3: RGB Camera with Multiplicity of LED Colors

In a third embodiment, the imaging device is a multi-channel RGB camera of the Bayer design or with a color separation prism. The light sources are LEDs at a variety of emission colors, such as deep red, orange-red, amber, green, cyan, blue, and violet. There may be three LEDs of each color, arranged in groups, wherein each group contains one of each of the colors, and wherein the groups are arranged so as to be separated by 120° around a ring.

Each of the LEDs in each of the groups is used to illuminate the sample area and an image is collected. Thus, if there are three groups of seven LEDs, there will be a total of 21 images collected.

Embodiment #4: Multiple Cameras and One Light Source

The arrangement may be set up so as to be 0/45, which is to say, there is one light source at 0° (perpendicular to the sample surface) and there are a set of cameras arranged in a ring around the measurement area. This is a salubrious arrangement in that a single filter wheel can be positioned between the light source and the sample. This arrangement will likely require a geometric correction of the pixels in the images so that corresponding positions in the images align with each other.

Embodiment #5: Three Light Sources at 120° with Additional LEDs not in Groups Specular reflection is largely wavelength independent. Thus, a single set of light sources arranged in a ring (e.g. three white LEDs arranged 120° apart) may be adequate to characterize the pixels as being specular highlight. Note that any pixel which is characterized as being flat (parallel to the sample surface) will likely not be subject to variance as the direction of illumination changes.

Thus, white LEDs are positioned around the ring at 0°, 120°, and 240°. The rest of the available positions are occupied by LEDs of various colors, without the restriction of being triplicated around the ring. Some of the LEDs may have narrowband filters so as to provide greater selectivity of the spectral illumination.

Embodiment #6: Combined Polarized and Non-Polarized Imaging

It has been identified that specular cross-polarized filters can be used to eliminate substantially all of the specular reflection, without regard to whether the specular reflection would be perceived as a specular highlight.

In this embodiment, an imaging device is used to capture both cross-polarized and nonpolarized images. Algorithms are then used to compare the resulting images and determine the amount of specular reflection at each pixel in the images. If sufficient adjacent pixels with sufficient amounts of specular reflection are found, then the grouping is characterized as being a specular highlight.

In one implementation of this embodiment, the imaging device is at 0°, perpendicular to the sample surface. A first polarized filter is between the imaging device and the sample. The light sources are arranged in a ring, with a subset of the light sources including a second set of polarizing filters between the illumination source and the sample. The second set of polarizing filters is oriented with polarization direction perpendicular to the polarization orientation of the first polarizing filter. A subset of the images is collected with only the illuminations sources which include polarizing filters and another subset of the images are collected without the illumination sources which do not include polarizing filters.

With respect to the software, the imaging subsystem provides a collection of images wherein the individual pixels contain varying amount of specular reflection. A region of interest is established within the images. The pixels within the region of interest are analyzed by comparing the intensity values of corresponding pixels from corresponding locations to determine an amount of specular component. The amount of specular component may, for example, be the difference between the maximum intensity value for that pixel and the minimum intensity value. If said difference is above a pre-determined threshold, then the pixel is characterized as being strongly specular.

An agglomeration technique is used to collect pixels which are adjacent, and which are strongly specular so as to form a specular clump. This technique may be modified so that a second pre-determined threshold is applied for pixels that are adjacent to other pixels which are above the first threshold. The agglomeration technique may include a step of binary morphological operations so as to fill in pixels that are surrounded by pixels that are strongly specular. Morphological operations may also join together nearby specular clumps.

A determination of whether the clump is deemed perceptible is then made. The pixel count of the specular clumps is then determined. If the pixel count is above a given threshold, then all the pixels in the clump are characterized as being part of a specular highlight. The specular highlight characterization may also take into account some measure of the shape of the specular clump. For example, if the ratio of the number of pixels in the clump that are at the edge of the specular clump (as opposed to having all neighboring pixels as part of the specular clump) may further be used to distinguish between clumps that are perceptible and those which are not.

Finally, all the pixels that have not been characterized as belonging to a perceptible clump are submitted to a processing step to determine a color of the region of interest. This processing step may include black level correction, non-linearity correction, white level calibration, correction for uneven illumination and vignetting of the lens, averaging, and conversion of intensity values to a color measurement. All of these processing steps are well-known in the art.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. An apparatus for a digital imaging device, comprising:
a housing;
a controller within the housing;
at least one illumination element in communication with the controller;
an attachment means for removably coupling the apparatus to a digital imaging device, the attachment means being one of a resilient clip, Velcro and/or a magnet;
wherein the controller is configured to control at least one of an intensity and/or volume of light emitted by the at least one illumination element in dependence upon a distance of the apparatus from a target surface; and
a distance sensor in communication with the controller, the distance sensor being configured to sense the distance of the apparatus from the target surface.

2. The apparatus of claim 1, wherein:
the controller is configured to control at least one of the intensity and/or volume of light emitted by the at least one illumination element in real time or near real time in dependence upon the distance of the apparatus from a target surface.

3. The apparatus of claim 1, further comprising:
an aperture positioned for alignment with a camera lens of the digital imaging device.

4. The apparatus of claim 1, further comprising:
a vibration generating mechanism in communication with the controller;
wherein the controller is configured to actuate the vibration generating mechanism to produce a tactile indication to a user when the distance of the apparatus from the target surface is approximately equal to a target distance.

5. The apparatus of claim 1, further comprising:
a mechanism for generating an audible tone in communication with the controller;
wherein the controller is configured to actuate the mechanism for generating an audible tone produce an audible tone when the distance of the apparatus of from the target surface is approximately equal to a target distance.

6. The apparatus of claim 1, further comprising:
a haptic sensor in communication with the controller, the haptic sensor being configured to detect a vibration signal from the digital imaging device;
wherein the controller is configured to activate the at least one illumination element in response to detection of the vibration signal.

7. The apparatus of claim 6, further comprising:
at least one of a vibration generating mechanism and an audible tone generating mechanism;
wherein the controller is configured to control the vibration generating mechanism and/or the audible tone generating mechanism to generate a vibration and/or an audible tone when a target distance is achieved;
wherein the vibration and/or the audible tone is configured to be received by an accelerometer and/or a microphone of the digital imaging device.

8. An apparatus for a digital imaging device, comprising:
a housing;
a controller within the housing;
at least one illumination element in communication with the controller; and
an attachment means for removably coupling the apparatus to a digital imaging device, the attachment means being one of a resilient clip, Velcro and/or a magnet;
wherein the controller is configured to control at least one of an intensity and/or volume of light emitted by the at least one illumination element in dependence upon a detected distance of the apparatus from a target surface;
wherein the at least one illumination element is a plurality of illumination elements; and
wherein at least one of the illumination elements is positioned in the housing so as to emit light at an angle or color that is different from the angle or color of light emitted from at least another of the illumination elements.

9. A method of enabling a digital imaging device to acquire, measure and/or process surface property data of a target surface, comprising the steps of:
with an auxiliary apparatus coupled to the digital imaging device, sensing a distance of the auxiliary apparatus from the target surface;
with the auxiliary apparatus, generating at least one of a haptic signal and/or audible tone when the distance equals a predetermined distance, at least one of the haptic signal and the audible tone being configured for detection by the digital imaging device; and
in response to a flash, sound and/or vibration from the digital imaging device, illuminating the target surface with light emitted from at least one illumination element of the auxiliary apparatus.

10. The method according to claim 9, wherein:
the light emitted from the at least one illumination element of the auxiliary apparatus is of at least one of a sufficient intensity, volume, angle, and/or color temperature to substantially negate effects of ambient light on an appearance of the target surface to the digital imaging device.

11. The method according to claim 9, wherein:
the auxiliary apparatus includes a distance sensor for sensing the distance of the auxiliary apparatus from the target surface; and
the auxiliary apparatus includes a haptic vibration sensor for sensing the vibration generated by the digital imaging device.

12. The method according to claim 9, wherein:
the digital imaging device is a smartphone or tablet.

13. The method according to claim 9, wherein:
the at least one illumination element is a plurality of illumination element;
wherein at least one of the illumination elements is configured to emit light at an angle or color that is different from the angle or color of light emitted from at least another of the illumination elements.

14. The method according to claim 9, further comprising the step of:
varying at least one of an intensity and/or volume of light emitted by the at least one illumination element in real time or near real time in dependence upon the distance of the auxiliary apparatus from the target surface.

15. The method according to claim 12, further comprising the step of:
removably connecting the auxiliary apparatus to the smartphone or tablet.

16. An apparatus for enabling a digital imaging device to acquire, measure and/or process surface property data of a target surface, comprising:
a controller;
at least one illumination element in communication with the controller, the at least one illumination element being configured to emit light of a sufficient intensity, angle and/or volume to substantially negate effects of ambient light on an appearance of the target surface to a camera of the digital imaging device;
a distance sensor in communication with the controller, the distance sensor being configured to sense a distance of the auxiliary apparatus from a target surface;
a haptic sensor in communication with the controller, the haptic sensor being configured to detect a vibration from the digital imaging device; and
at least one of a vibration generating mechanism and an audible tone generating mechanism;
wherein the controller is configured to control the vibration generating mechanism and/or the audible tone generating mechanism to generate a vibration and/or an audible tone when the distance sensed by the distance sensor matches a target distance;
wherein the vibration and/or the audible tone is configured to be received by an accelerometer and/or a microphone of the digital imaging device.

17. The apparatus of claim 16, wherein:
the controller is configured to activate the at least one illumination element in response to detection of the vibration from the digital imaging device by the haptic sensor.

\* \* \* \* \*